H. H. CUMMINGS.
MECHANICAL MOVEMENT.
APPLICATION FILED MAR. 3, 1913.
1,197,013.
Patented Sept. 5, 1916.
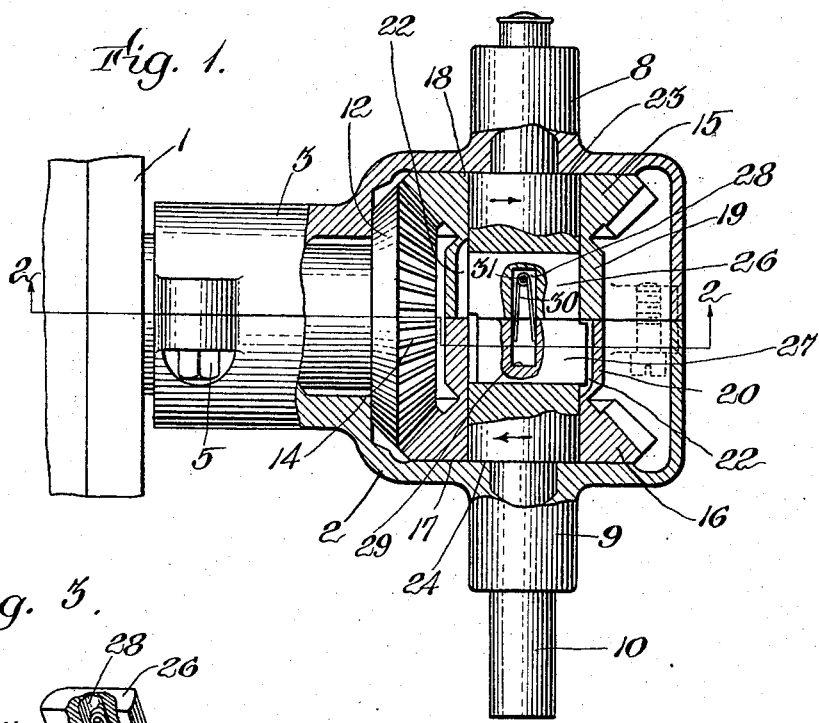
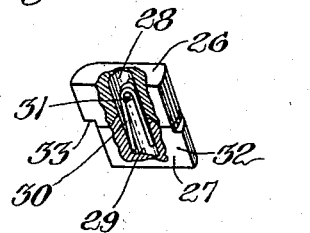
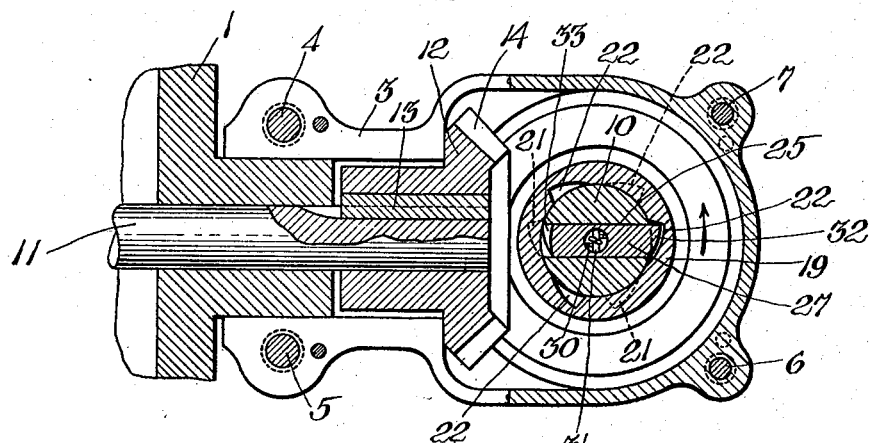
Witnesses:
Edward Maxwell
James R. Hodder
Inventor:
Henry H. Cummings,
by Geo. H. Maxwell,
Attorney.

UNITED STATES PATENT OFFICE.

HENRY H. CUMMINGS, OF BOSTON, MASSACHUSETTS.

MECHANICAL MOVEMENT.

1,197,013.  Specification of Letters Patent.  Patented Sept. 5, 1916.

Application filed March 3, 1913. Serial No. 751,807.

*To all whom it may concern:*

Be it known that I, HENRY H. CUMMINGS, a citizen of the United States, and resident of Boston, county of Suffolk, State of Massachusetts, have invented an Improvement in Mechanical Movements, of which the following description, in connection with the accompanying drawings, is a specification, like letters on the drawings representing like parts.

This invention relates to mechanical means for securing a constant and continuous direction of movement of a driven member irrespective of the direction of movement of the driving member, and its object is to improve and perfect devices of this kind.

In registering the number of rotations of the propelling shafts of ships, it is frequently desirable to register the same irrespective of whether such shaft is going in a direction to drive the ship ahead, or the reverse, and my present invention relates to improved means for securing such a counting or registering by means of beveled gears. For purposes of the kind just described and in apparatus therefor, such as is shown in my copending application Serial No. 717,453, filed August 28, 1912, it is of the utmost importance to insure the counting or registering of each turn or revolution of a shaft, and to eliminate as absolutely as possible, the chance for slip, error, or any inaccuracy. Therefore, ordinary clutches, double pawls and ratchets, and such like mechanism have been found to be entirely unreliable, and accordingly I have discovered an automatic device which will accomplish the purpose above set forth with great accuracy, speed, and efficiency with practically no chance for slip or error. I have preferably embodied my invention, interposed between a driving and a driven shaft, placed at right angles to each other and by using two beveled gears on the driving shaft in mesh with a corresponding gear on the driven shaft, and means which constantly and automatically lock the driving shaft to either one of the beveled gears carried thereby or to the other one, at no time permitting a gear to rotate disconnected, while instantly releasing one of said gears and throwing the other into operative connection with the driving shaft upon a reversal of the rotative movement of said shaft.

Referring to the drawings, illustrating a preferred embodiment of my invention, Figure 1 is a view partially in cross section of my improved device; Fig. 2 is a view also in cross section on the line 2—2 of Fig. 1, looking in the direction of the arrows; and Fig. 3 is a detail perspective view, partially in cross section of the shiftable dogs.

As shown in the drawings, I have provided a closed casing which may be mounted on a support 1, said casing comprising members 2 and 3 bolted together at 4, 5, 6, and 7, and having journal bearings 8 and 9 for a driving shaft 10. A driven shaft 11, arranged at a right angle to the driving shaft and journaled in suitable bearings in the support 1 is provided with a miter gear 12 secured thereto by a key 13 and having its teeth 14 arranged to mesh with the mitered teeth of the gears 15 and 16 mounted loosely on the shaft 10, as shown in Fig. 1. It will be understood that the axis of the driving shaft 10 and that of the driven shaft 11 are in the same plane, and that the gears 15 and 16 are so positioned on the shaft 10 that their respective teeth mesh with those on the gear 12 at diametrically opposite points. Preferably the casing 2 and 3 constitutes a bearing surface, as indicated at 17 and 18 respectively, to hold the gears 15 and 16 firmly and constantly in mesh with the teeth 14. These gears 15 and 16 are each provided with hubs 19 and 20 respectively to encircle the shaft 10, and preferably of equal length and sufficient to almost or actually contact, as clearly seen in Fig. 1. The hub 19 is provided with a series of internal recesses 21, preferably at least three in number, and the hub 20 is similarly provided with recesses 22. The shaft 10 is preferably enlarged within the casings 2, 3, to provide bearing shoulders upon the inner surface of said casing, as indicated at 23, and 24, in order to insure a firm and compact assemblage of all parts within the casing, although this feature is not necessary. It will be understood that the gear wheels 15 and 16 are mounted on the shaft 10 so as to constitute a "running" fit and as both of said gears are constantly in mesh with the wheel 12, one must turn loosely on the driving shaft, while the other is secured thereto and is driving the driven shaft and the other loose gear wheel on the driving shaft.

The driving shaft 10 is slotted centrally at 25, and I provide two dogs 26 and 27 of appropriate length and thickness to fit and substantially fill this slot. Each dog is bored centrally in width, but slightly staggered longitudinally, to form sockets or recesses 28 and 29, as shown in Figs. 1 and 3, and a two-pronged spring 30 is fitted within said sockets, having its central portion wound or otherwise secured to a pin 31 in the upper dog 26, and its extending arms bearing against the walls of the socket 29 in the lower dog 27. These two dogs are of a length equal to the diameter of the shaft 10 at the slot portion, but are provided on ends opposite to each other with slightly beveled portions to correspond with the wedge shaped recesses 21 and 22 respectively, said wedge formation being arranged for driving the shaft 10 in opposite directions as will be readily understood on reference to Fig. 2. The operation of these dogs is to alternately connect the driving shaft 10 with the gears 15 and 16 and to automatically disconnect one gear before connecting the other into driving engagement, during the reversal of movement of the shaft 10. The gears 15 and 16 are assembled on the shaft 10 with the recesses 21 and 22 arranged for driving engagement in opposite directions. When the shaft 10 is rotated in the direction of the arrow, Fig. 2, and when the beveled part 32 of the dog 27 is in register with a recess 22 in the hub of the gear 16, it will be actuated to move therein by the spring 30. Engagement of the dog 27 with the gear 16 will of course actuate the driven shaft 11 in one direction. Upon reversal of the direction of movement of the shaft 10, release of the dog 27 from engagement of the gear 16 and reengagement of the shaft 10 with the other gear 15 through the sliding action of the dog 26, the shaft 11 will continue to be rotated in the same direction and the sliding action of the dogs 26 and 27 will now be described. At the beginning of the reversal of movement of the shaft 10, the wedge shaped part of the recess 32 will tend to force the dog 27 inwardly, sliding the same into the slot 25 and as soon as the beveled portion 33 of the dog 26 comes into register with an adjacent recess 21, the action of the spring 30 will of course force the same into register with said recess and drive the opposite gear 15, thus continuing the positive driving connection of the shaft 10 with the shaft 11, but at a diametrically opposite point so that said shaft 11 is still rotated in the same direction as formerly. The spring 30 permits the dog 27 to be slid entirely within the limits of length afforded by the slot 25, even before the other dog 26 is slid outwardly to register with a recess 21, by the yielding of the spring 30. It will be also understood that the action of the spring 30 tends to maintain the dogs 26 and 27 in the same position relative with each other, because the arms of said spring press equally upon the diametrically opposite walls of the socket 29 in one dog and being pivoted at the same point, viz., to the pin 31 in the other dog. Thus, while one dog is in engagement with its respective driving recess, the other is held normally within the protective diameter of the slot 25 and its adjacent beveled gear, which then is rotating in the opposite direction, is allowed to run freely without any clicking contact or frictional engagement therewith.

Preferably the distances between each of the recesses 21 and similarly between each of the recesses 22, are sufficient so that during the beginning of the reversal of direction in the driving shaft 10, the dog which has been in driving engagement with its gear up to the time of such change in movement, will be forced entirely out of its driving recess and both dogs will then be held within the walls of their containing slot until the first recess in the other gear comes into register with the other dog when the spring 30 acts as indicated.

It will thus be seen that I have provided a positive driving connection between a driving shaft and a driven shaft, whereby the driven shaft is rotated constantly in one direction irrespective of the directions of movement, or reversal of directions of movement, of the driving shaft, and thus if the driven shaft be connected to a rotation counter or indicator, each rotation of the driving shaft is registered irrespective of its reversal of movement. I also have provided means whereby a driving member, for example, the dog 27, is automatically retracted from engagement with its coöperating gear, and moreover is held entirely out of engagement or contact with its coöperating gear, while the shaft is rotating in the other direction, and consequently while its coöperating gear is rotating in a reverse direction. I have also provided means for maintaining the driving shaft in operating connection with the driven shaft without danger of allowing a single rotation of the driving member to slip or be lost, which would be a serious and fatal objection where the numbers of revolutions are to be counted. This is one of the important features of my present invention over such prior devices as friction clutches and the like, which are entirely unsuitable for the purposes for which my invention is intended.

Having described my invention, what I claim as new and desire to secure by Letters Patent is:

1. A driving shaft, a driven shaft, and means to rotate the driven shaft in one continuous direction irrespective of the direction of rotation of the driving shaft, said means comprising a gear fixed on the driven shaft, two gears carried by the driving shaft and constantly in mesh at diametrically opposite points with the gear on the driven shaft, a sliding dog carried by the driving shaft to connect said shaft and one gear, and yielding means operated by the reversal of the direction of rotation of said driving shaft to establish a driving connection from the shaft to the other gear.

2. A driving shaft, a driven shaft, and means to rotate the driven shaft in one continuous direction irrespective of the direction of rotation of the driving shaft, said means comprising a gear fixed on the driven shaft, two gears carried by the driving shaft and constantly in mesh at diametrically opposite points with the gear on the driven shaft, two members carried by the driving shaft and arranged to connect the same with each of the gears carried thereby, and yielding means to maintain said members normally in the same relative relation, and to establish driving connection of one member with its adjacent gear while disconnecting the other member from driving connection of its gear during reversal of rotation of said driving shaft.

3. A driving shaft, a driven shaft, and means to rotate the driven shaft in one continuous direction irrespective of the direction of rotation of the driving shaft, said means comprising two gears on the driving shaft, a member to connect each gear with said driving shaft, and means carried by one member to maintain the other member out of driving action with its adjacent gear during the operative connection of the other member with its adjacent gear.

In testimony whereof, I have signed my name to this specification, in the presence of two subscribing witnesses.

HENRY H. CUMMINGS.

Witnesses:
 JAMES R. HODDER,
 R. J. HERSEY.

Copies of this patent may be obtained for five cents each, by addressing the "Commissioner of Patents, Washington, D. C."